US012004544B2

(12) United States Patent
Barewal et al.

(10) Patent No.: US 12,004,544 B2
(45) Date of Patent: Jun. 11, 2024

(54) FOOD PRODUCT FOR CHEWING OR SWALLOWING DIFFICULTY

(71) Applicant: Savorease Therapeutic Foods Inc., Dover, DE (US)

(72) Inventors: Reva Barewal, Portland, OR (US); Sarah Masoni, Milwaukie, OR (US); Jason Ball, Portland, OR (US)

(73) Assignee: SAVOREASE THERAPEUTIC FOODS INC., Dover, DE (US)

( * ) Notice: Subject to any disclaimer, the term of this patent is extended or adjusted under 35 U.S.C. 154(b) by 414 days.

(21) Appl. No.: 16/238,436

(22) Filed: Jan. 2, 2019

(65) Prior Publication Data
US 2019/0200662 A1 Jul. 4, 2019

Related U.S. Application Data

(60) Provisional application No. 62/613,380, filed on Jan. 3, 2018.

(51) Int. Cl.
*A23L 33/115* (2016.01)
*A21D 2/18* (2006.01)
(Continued)

(52) U.S. Cl.
CPC ............ *A23L 33/115* (2016.08); *A21D 2/183* (2013.01); *A21D 2/188* (2013.01); *A21D 2/266* (2013.01); *A21D 13/50* (2017.01); *A23D 7/005* (2013.01); *A23D 7/0053* (2013.01); *A23D 9/00* (2013.01); *A23L 11/00* (2016.08); *A23L 27/30* (2016.08); *A23L 29/262* (2016.08); *A23L 29/269* (2016.08); *A23L 33/00* (2016.08);
(Continued)

(58) Field of Classification Search
CPC ......... A21D 13/50; A21D 2/266; A23L 11/00; A23L 29/262; A23L 33/105; A23L 33/40; A21K 2/183; A21K 2/188; A21K 2/266; A21K 13/50; A21K 7/005; A21K 7/0053
See application file for complete search history.

(56) References Cited

U.S. PATENT DOCUMENTS

2006/0019012 A1 1/2006 Novotny et al.
2014/0072672 A1 3/2014 Nisbet et al.
(Continued)

FOREIGN PATENT DOCUMENTS

| WO | WO-2016049577 A1 * | 3/2016 | ............ B65D 83/14 |
| WO | 2017147059 A1 | 8/2017 | |
| WO | WO-2018116292 A1 * | 6/2018 | ........... A23L 33/185 |

OTHER PUBLICATIONS

Igoe et al Dictionary of Food Ingredients 3rd Edition, p. 112 Chapman and Hall 1996 (Year: 1996).*
(Continued)

*Primary Examiner* — Vera Stulii
(74) *Attorney, Agent, or Firm* — Alleman Hall & Tuttle LLP

(57) ABSTRACT

Examples are disclosed that relate to a food product and a method of manufacturing a food product. One disclosed example provides a food product including a foamed aquafaba-containing substrate network, a strengthening component configured to provide mechanical strength to the foamed aquafaba-containing substrate network, a polysaccharide-based viscosity-increasing component, and a starch.

11 Claims, 3 Drawing Sheets

(51) Int. Cl.
*A21D 2/26* (2006.01)
*A21D 13/50* (2017.01)
*A23D 7/005* (2006.01)
*A23D 9/00* (2006.01)
*A23L 11/00* (2021.01)
*A23L 27/30* (2016.01)
*A23L 29/262* (2016.01)
*A23L 29/269* (2016.01)
*A23L 33/00* (2016.01)
*A23D 9/007* (2006.01)
*A23L 33/105* (2016.01)
*A23L 33/17* (2016.01)

(52) U.S. Cl.
CPC ............. *A23D 9/007* (2013.01); *A23L 33/105* (2016.08); *A23L 33/17* (2016.08); *A23L 33/40* (2016.08); *A23V 2002/00* (2013.01)

(56) References Cited

U.S. PATENT DOCUMENTS

| 2016/0044946 | A1 | 2/2016 | Gallegos-Montes et al. | |
| 2016/0353788 | A1 | 12/2016 | Sliwinski | |
| 2017/0325467 | A1* | 11/2017 | Bagan | A23C 9/13 |

OTHER PUBLICATIONS

Corriher, S. 2000. "How Fragile Egg-White Foams are Transformed into Firm, Airy Meringues." Fine Cooking, Issue. 38. Downloaded Oct. 20, 2021, from https://www.finecooking.com/article/how-fragile-egg-white-foams-are-transformed-into-firm-airy-meringues#:~:text=Besides%20adding%20sweetness%2C%20sugar%20helps,an.*

ISA United States Patent and Trademark Office, International Search Report and Written Opinion Issued in Application No. PCT/US19/12104, Mar. 8, 2019, WIPO, 9 pages.

Grogan, B., "First Adventures with Yellow Split Pea Puree Fat Sub & A New Fat-Free Muffin Recipe," Bryanna Clark Grogan's Vegan Feast Kitchen/ 21st Century Table, Available Online at http://veganfeastkitchen.blogspot.com/2017/01/first-adventures-with-yellow-split-pea.html, Jan. 30, 2017, 7 pages.

Bradford, A. "How to turn your oven into a dehydrator," C|NET, Available Online at https://www.cnet.com/how-to/dont-have-a-dehydrator-use-your-oven/, Mar. 9, 2016, 4 pages.

"Egg-Free, Gelatin-Free, Vegan Gumpaste," Geeky Cakes, Available Online at https://geekycakes.com/2015/04/28/egg-free-gelatin-free-vegan-gumpaste/, Apr. 28, 2015, 7 pages.

European Patent Office, Partial Supplementary European Search Report Issued in Application No. 19735779.1, Aug. 12, 2021, Germany, 14 pages.

European Patent Office, Extended European Search Report Issued in Application No. 19735779.1, Nov. 12, 2021, Germany, 12 pages.

* cited by examiner

| Analyte | Result | Min. Det. Limit | Reporting Limit | Units | Analysis Completed | Method | Qualifiers |
|---|---|---|---|---|---|---|---|
| Ash | 0.4 | 0.1 | 0.1 | % (wb) | 1/25/16 | AOAC 923.03 | |
| Calcium | 7.3 | 0.1 | 0.1 | mg/100 g | 2/09/16 | AOAC985.35/984.27 | |
| Calories from Fat | 2 | | | Cal/100 g | 2/09/16 | Calculation | |
| Total Calories | 18 | | | Cal/100 g | 2/09/16 | Calculation | |
| Total Carbohydrates | 2.9 | | | % (wb) | 2/09/16 | BY DIFFERENCE | |
| Cholesterol | ND | 1.0 | 1.0 | mg/100 g | 2/01/16 | AOAC 994.10 | |
| Trans-Fat | ND | 0.1 | 0.1 | % (wb) | 1/29/16 | AOAC 996.06 | |
| Saturated Fat | ND | 0.1 | 0.1 | % (wb) | 1/29/16 | AOAC 996.06 | |
| Total Fat | 0.2 | 0.1 | 0.1 | % (wb) | 1/29/16 | AOAC 996.06 | |
| Dietary Fiber, Total | ND | 0.1 | 0.1 | % (wb) | 1/28/16 | AOAC 985.29 | |
| Iron | 0.5 | 0.1 | 0.1 | mg/100 g | 2/09/16 | AOAC985.35/984.27 | |
| Moisture | 95.4 | 0.1 | 0.1 | % (wb) | 1/25/16 | AOAC 984.25 | |
| Protein | 1.0 | 0.1 | 0.1 | % (wb) | 1/22/16 | AOAC 992.15 | |
| Sodium | 3.2 | 0.1 | 0.1 | mg/100 g | 2/10/16 | AOAC985.35/984.27 | |
| Sugars (Total as Suc) | 1.3 | 0.2 | 0.2 | % (wb) | 1/21/16 | AOAC 925.05 | |
| Vit. A (Retinol) | ND | 50 | 100 | IU/100 g | 1/28/16 | AOAC 2001.13 | |
| Vit. C (L-Ascorbic Acid) | ND | 1.0 | 1.0 | mg/100 g | 1/27/16 | PCHEM 0005 HPLC | |

NOTE: ND = Non-Detected

FIG. 1

| | | |
|---|---|---|
| Gram Weight | 19 | g |
| Calories | 96.1 | kcal |
| Calories from Fat | 72.05 | kcal |
| Calories from SatFat | 9.95 | kcal |
| Protein | 2.16 | g |
| Carbohydrates | 4.45 | g |
| Total Dietary Fiber | 1.46 | g |
| Total Soluble Fiber | 1.04 | g |
| Total Sugars | 0.63 | g |
| Monosaccharides | 0 | g |
| Disaccharides | 0 | g |
| Other Carbs | 1.67 | g |
| Fat | 8.15 | g |
| Saturated Fat | 1.11 | g |
| Mono Fat | 5.84 | g |
| Poly Fat | 0.84 | g |
| Trans Fatty Acid | 0 | g |
| Cholesterol | 0 | mg |
| Water | 3.87 | g |

FIG. 3

FOOD PRODUCT FOR CHEWING OR SWALLOWING DIFFICULTY

BACKGROUND

Malnutrition is a common and serious problem. Factors contributing to this issue are reduced appetite and taste alteration, poor dentition, dysphagia, feeding assistance requirements, chronic illness, and medication. Dysphagia, or difficulty swallowing, may occur due to old age, an injury or a nerve or muscle abnormality, as examples. In many cases, treatment for dysphagia includes dietary changes which may further contribute to risk of malnutrition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to a solid food product that may be consumed by a dysphagic individual or those without capacity to chew food. One example provides a food product comprising a foamed aquafaba-containing substrate network, a strengthening component configured to provide mechanical strength to the foamed aquafaba-containing substrate network, a polysaccharide, and a starch.

BRIEF DESCRIPTION OF THE DRAWINGS

FIG. 1 shows a table summarizing analyses performed on an aquafaba sample.

FIG. 3 shows a table depicting nutritional content of an example food product.

DETAILED DESCRIPTION

Figure 2:
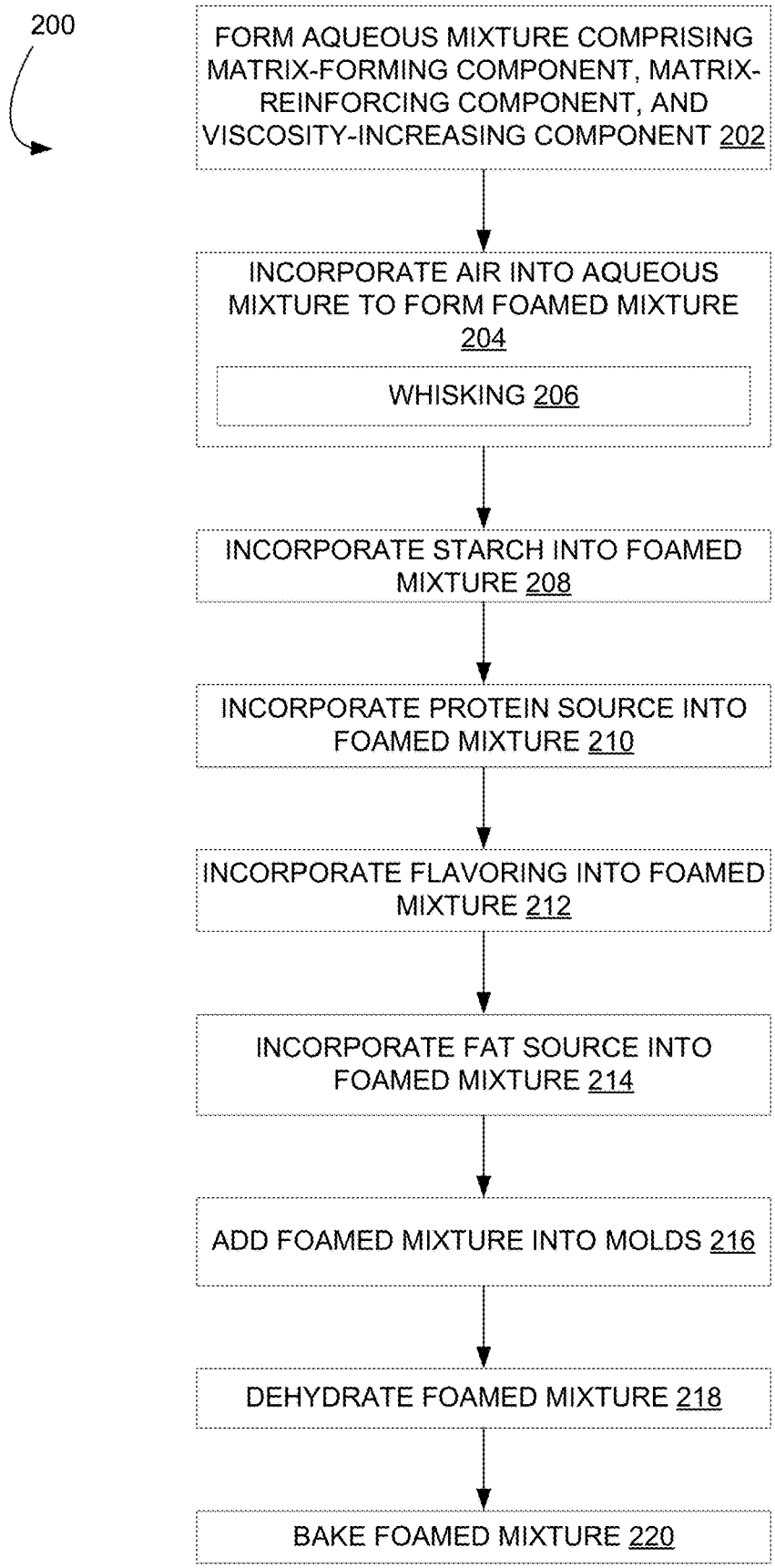
FIG. 2 shows a flow diagram illustrating an example method of manufacturing a food product.

Dysphagia, or difficulty swallowing, is commonly experienced among the elderly population. A head or spinal cord injury, stroke, amyotrophic lateral sclerosis (ALS), Alzheimer's disease, Huntington's disease, multiple sclerosis, frontotemporal dementia, Parkinson's disease, and cerebral palsy, among other conditions, also may cause dysphagia. Further, dysphagia may affect children born prematurely or at low birth weight, as well as those with cerebral palsy, a cleft lip and/or palate, or reflux, as examples. In some instances, a dysphagic individual may also have reduced saliva production, which may further impact their ability to swallow foods.

Numerous complications may arise from dysphagia, including malnutrition, depression, social isolation, weight loss, dehydration, aspiration pneumonia, exacerbation of chronic lung disease, and possibly death. When a person has difficulty chewing and/or swallowing, food, saliva, or other liquids may unintentionally enter his or her lungs rather than being swallowed into the esophagus. In such instances, the foreign substance entering the lungs may cause pulmonary aspiration or choking, either of which may result in asphyxiation. Further, aspirating portions of food or liquids trapped in the lungs may lead to aspiration pneumonia, a life-threatening swelling and/or infection of the lungs. Aspiration pneumonia is a common cause of death among elderly and is a leading cause of re-hospitalization following stroke. Due to hospital readmissions, emergency room visits, long-term institutional care (e.g., assisted living, skilled nursing, other facility care), and expensive support, among other factors, dysphagia may present an economic burden to individuals and to the healthcare system.

To treat dysphagia, an individual often is prescribed a texture modified diet, such as a pureed or mechanically soft diet. Older adults without dysphagia also may modify their diets to accommodate typical age-related changes in their systems, such as not eating tough-to-chew foods. In some instances, a person having trouble swallowing may also have impaired motor function, and thus may not be able to easily grasp utensils or foods, and may also not be able to easily transport food towards their mouth without spilling. Further, preparing meals specific for dysphagic individuals may involve extra time, equipment, and skill of a kitchen staff in an assisted living or skilled nursing facility.

While pureed and mechanically soft food options are available to satiate a dysphagic individual's hunger, ready-made snack options are often limited to shakes and puddings. Such snack foods tend to be high in sugar, which may increase risk for tooth decay among individuals with dry mouth and may pose a blood sugar management challenge among diabetics. Further, while pureed or mechanically soft foods may ease swallowing, such a diet may impair a person's general health and wellbeing. In some instances, a pureed or mechanically soft diet may not meet an individual's micronutrient requirements, such as not providing adequate protein. For example, one may experience weakened cheek muscles on a pureed or mechanically soft diet. Further, eating may be unenjoyable when all "safe" foods lack a texture or a savory flavor option. In some instances, dysphagia may deter a person from eating, for example, due to fear of aspiration or choking. The resulting loss of food enjoyment contributes to the risk of malnourishment. In any instance, malnutrition and the effects of malnutrition, including delayed wound healing, immune dysfunction, sarcopenia, and increased rates of hospitalization and mortality, may occur among persons with dysphagia.

Dysphagic individuals may lack access to a safe, nutritious, and flavorful snack option that maintains caloric need, provides food memory, and provides food satisfaction. As a result, some dysphagic individuals eat snacks that are not safe due to cravings that are insatiable with available products. Palatability of snack foods can have a significant impact on food enjoyment, and thus, on food intake. In some studies, improving flavors of foods improved nutritional intake and body weight among nursing home patients. In other studies, availability of energy-dense meals and snacks improved nutritional status of hospitalized patients. Further, there is an interest in ethnic, cultural food options due to increasing diversity among patient populations. However, the senses of taste and smell may deteriorate with age or due to various medications, and thus may influence food intake levels. Accordingly, there exists a need for a food product that provides a texture, reinstates confidence in one's ability to eat without aspirating, and also provides caloric nourishment.

Thus, examples are disclosed that relate to a snack food product that encourages positive food memory. As described below, the disclosed examples provide a crunchy initial mouth-feel, yet readily dissolve to a consistency that is safe to swallow without chewing forces. Some implementations may take the form of a transitional food, defined according to guidelines outlined by the International Dysphagia Diet Standardisation Initiative (IDDSI) as a food that starts at one texture and changes to another texture when combined with water or saliva. The disclosed examples also are nutritionally dense and, in some examples, provides similar caloric and nutritional value as pre-packaged nutritional shakes. In some examples, the disclosed examples may be provided in a pre-portioned and ready-to-eat manner, such that an individual or caregiver may perform minimal to no preparation. In other examples, the food product may be packaged in bulk quantities. Further, the disclosed examples are structurally robust, and may be such that someone may easily grasp the snack food without the snack food crumbling. This robust structure provides a snack food that is suitable for both eating alone and for dipping into various purees and/or spreads to obtain additional nutritional benefit and calories. Individuals having reduced appetite (e.g., necessitating smaller, more frequent meals), poor dentition, or feeding assistance due to poor hand-mouth coordination may also be at risk of malnutrition, and thus may benefit from the disclosed food products. In addition to dysphagic individuals, children transitioning from pureed to solid foods also may benefit from transitional foods, for example, to aid in normal learning of eating solid foods.

As described in more detail below, the disclosed snack foods comprise a foamed matrix reinforced by a water-soluble fiber-based material. The foamed matrix provides a substrate upon which other components in the snack food composition bind, whereas the water-soluble fiber-based material is configured to dissolve in the human mouth. The food product further comprises a viscosity-increasing component and a water-binding starch. In some examples, the food product additionally comprises one or more of a fat source, a protein source, an oleoresin, a juice concentrate, a vegetable puree, a flavoring compound, an oil flavoring, and/or a dry flavoring, which may contribute to the nutritional benefit, taste, and texture of the snack food. In some examples, the food product may contain a puree within an interior structure of the food product, and/or a fat coating on an exterior. The texture of the snack food is a stable exterior shell that may maintain structure and be easily "grasped", but that also may readily dissolve and change "states" when consumed (e.g., in presence of moisture, increased pressure, increased temperature, and/or other factors).

As described above, the foamed matrix provides a substrate upon which other components in the snack food composition bind. In some examples, the foamed matrix comprises an aquafaba-based matrix. Aquafaba, as used herein, describes an aqueous solution comprising starches, proteins, and other soluble plant solids that migrate from a pulse (e.g., a bean, lentil, legume, and/or pea) to water during a cooking process. Aquafaba may be derived from any suitable bean, lentil, pea or legume, for example, garbanzo beans (chickpeas). Aquafaba comprises emulsifying, foaming, binding, gelatinizing, and thickening properties, making it suitable for forming a foamed matrix, among other uses. Analyses of an aquafaba sample performed via Fourier-transform infrared (FT-IR) spectroscopy, starch assay with enzymatic kit, and high-performance anion exchange chromatography with pulsed amperometric detection (HPAEC-PAD) are summarized in the table shown in FIG. 1. These analyses show that the primary composition of the tested aquafaba sample was protein and starch. Unlike protein isolates and starch-based egg replacers, this spectrum allows aquafaba to be used in applications where its organoleptic properties may be advantageous over albumen. In other examples, the foamed matrix may comprise an egg white-based matrix.

The water-soluble fiber-based material serves as a strengthening component configured to reinforce and provide mechanical strength to the foamed matrix, and may also help to trap air by stabilizing the foamed matrix during a dehydration process. Further, the water-soluble fiber-based material-which provides a lubricating effect that allows the snack food to dissolve in the mouth and to be swallowed, even with reduced saliva presence. Any suitable water-soluble fiber-based material may be used. In some examples, the water-soluble fiber-based material comprises a hydrocolloid which acts as a thickening agent and a gelling agent. When mixed with aquafaba, the hydrocolloid binds to water in the aquafaba to form a viscous dispersion. In a more specific example, the hydrocolloid comprises the cellulosic gum methylcellulose, a hydrophilic compound derived from cellulose that readily dissolves in cold water. It will be understood that the term "methylcellulose" as used herein includes one or more of methyl cellulose (MC), carboxymethylcellulose (CMC), and hydroxypropylmethylcellulose (HPMC). In other examples, the water-soluble fiber-based material may comprise one or more of agar agar, locust bean gum, gellan gum, tara gum, gum Arabic, gum ghatti, konjac maannan, acacia gum, and carrageenan, in addition to or alternatively to methylcellulose.

As described above, the water-soluble fiber-based material provides a lubricating effect which allows the food product to be swallowed, even in the presence of reduced saliva. This effect may be attributed to the heat-set gelation of a hydrocolloid, which occurs by the unfolding and expansion of native starches and proteins upon heating, followed by their rearranging into a network. For example, for the gelation of hydrocolloids, the three main mechanisms are ionotropic gelation, cold-set gelation, and heat-set gelation. In some examples, the present invention involves combining MC, aquafaba, and xanthan gum to form a foam where air is incorporated but remains stable throughout a thermal drying process. CMC, similar to guar gum, is soluble in either cold or hot water, whereas MC readily dissolves in cold water. MC and HPMC form weak gels upon heating above a temperature of 52° C. for MC and above a temperature of 63-80° C. for HPMC.

Other ingredients also maybe used in addition to or instead of a water-soluble fiber-based material. For example, cream of tartar or another acidic salt may help to stabilize a foamed matrix, such as an egg white-based foamed matrix. The acidity of cream of tartar, when combined with egg whites, denatures protein within the egg whites (e.g. albumin), which may help to trap and stabilize air and water bubbles without significant weeping of the foamed matrix. However, cream of tartar may not withstand dehydration as well as a water-soluble fiber-based material. Weeping may be indicative of an unstable foamed matrix. Thus, the addition of a component to reduce or to help prevent weeping also may help to stabilize the foamed matrix. Further, a sugar may serve as an effective water-binder and may help to prevent collapse of the foamed matrix. However, a sugar may not provide as much structural support as methylcellulose.

The viscosity-increasing component increases the viscosity of a mixture comprising aquafaba (and/or egg whites) and the water-soluble fiber-based material. In some examples, such as when including a fat source in the composition of the snack food, the viscosity-increasing component also may help to stabilize an emulsion of the fat source. In some examples, the viscosity-increasing component comprises a polysaccharide. In a more specific example, the viscosity-increasing component comprises xanthan gum, a polysaccharide-based hydrocolloid that is readily dispersed and hydrated in an aqueous solution, and is effective in a wide pH range and brix range. Xanthan gum also may increase an emulsion stability of the foam, in some examples. In other examples, the viscosity-increasing component may comprise one or more of guar gum, locust bean gum, gum karaya, gum tragacanth, and gum Arabic, in addition to or alternatively to xanthan gum.

The starch binds water and swells, which may help to stabilize a volume of the foamed matrix, for example, during a dehydration process. Any suitable water-binding starch may be used in a composition of the food product. In some examples, the starch comprises potato starch due to its high water-binding capacity. Potato starch also may help to provide a taste and texture reminiscent of potato chips for positive food memory. In other examples, the starch may comprise one or more of rice starch, oat starch, wheat starch, tapioca, and corn starch, in addition to or alternatively to potato starch.

In some examples, the snack food further comprises one or more of a fat source and a protein source. Such ingredients, when incorporated, may provide nutritive benefits, varied flavor, and varied texture to the snack food. In one specific example, incorporating olive oil softens the texture of the snack food, which may assist in dissolving the snack food during consumption. As other examples, one or more of butter, shortening, coconut oil, extra virgin olive oil, peanut oil (or other legume- or nut-derived oil), and any other suitable fat source may be included, in addition to or alternatively to olive oil. Protein sources may include, as non-limiting examples, whey protein and pea protein. In some examples, a food product composition may accommodate various dietary restrictions and/or preferences based upon the type and quantity of the protein source incorporated. For example, a food product composition incorporating pea protein may appeal to a vegan diet.

Flavorings may be included to enhance the taste of the snack food. It will be understood that the food product may include any suitable flavoring or combination of flavorings. For example, a composition may include an oil flavoring such as garlic oil or an oil composition. One or more oleoresins and/or other flavoring compounds also may be used, such as an artificial flavoring. In a more specific example, an artificial butter flavoring may be used (e.g. diacetyl). The food product may additionally or alternatively include dry flavorings such as herbs (e.g. parsley, cilantro, etc.), garlic powder, cheese powder, cream powder, vegetable powder (e.g. corn powder, dried onion granules, etc.), chili powder, chili-lime seasoning, ground peppercorn, sea salt, and/or other spices. Further, vegetable purees (e.g. carrot, pea, etc.) and/or juice concentrates may be used to impart flavor. Though optional, such flavor additives may help to improve food memory and satiate cravings for a dysphagic individual. Further, such additives may help to achieve a desired color of the food product.

FIG. 2 depicts one example method of manufacturing a food product configured to be safely consumed by a dysphagic individual. At 202, method 200 includes forming an aqueous mixture comprising a matrix-forming component, a matrix-reinforcing component, and a viscosity-increasing component. The aqueous mixture may be formed in any suitable manner, for example, via blending or mechanical mixing. In one specific example, the aqueous mixture comprises 98-99 wt % of the matrix-forming component, 0.90-1.00 wt % of the matrix-reinforcing component, and 0.10-0.20 wt % of the viscosity-increasing component. As described above, the matrix-forming component may comprise one or more of aquafaba and egg whites, the matrix-reinforcing component may comprise one or more of methylcellulose, agar agar, locust bean gum, gellan gum, tara gum, gum Arabic, gum ghatti, konjac maanan, acacia gum, and carrageenan, and the viscosity-increasing component may comprise one or more of xanthan gum, guar gum, locust bean gum, gum karaya, gum tragacanth, and gum Arabic.

At 204, method 200 includes incorporating air into the aqueous mixture comprising the matrix-forming component, the matrix-reinforcing component, and the viscosity-increasing component to form a foamed mixture. Any suitable technique may be used to incorporate air. In some examples, incorporating air comprises blending the aqueous mixture via a blender. In some such examples, method 200 may comprise blending the matrix-forming component to incorporate air prior to incorporating the matrix-reinforcing component and the viscosity-increasing component, and then continuing the blend the mixture to further incorporate air. In other examples, incorporating air may comprise, as indicated at 206, whisking the aqueous mixture. In a more specific example, method 200 may comprise whisking the aqueous mixture at a high speed via a mixer (e.g. a stand mixer). Whisking may be performed for any suitable amount of time. In some examples, whisking may be performed for 30 seconds to 5 minutes. As the food product is envisaged to be suitable for handling without crumbling by persons having reduced motor function, shorter whisking times (e.g. under two minutes) may provide a more stable structure. In other examples, longer whisking times (e.g., greater than two minutes) may produce a snack food that has a crunchier initial mouth-feel. In any example, aeration of the foamed mixture may influence robustness and texture of the snack food product. Hydrating the foamed mixture also may help control aeration. In a more specific example, hydrating the foamed mixture for 4-6 hours at a temperature between 35-40° F. may help to decrease aeration, and thus may decrease brittleness of the snack food. In some examples, a hydrated foamed mixture may maintain a useable consistency and freshness for up to one week in refrigerated conditions.

After forming the foamed mixture, method 200 includes, at 208, incorporating a starch into the foamed mixture. Further, as indicated at 210, method 200 may include incorporating a protein source, such as one or more of whey protein, pea protein, rice protein, wheat protein, soy protein, egg white protein, and casein protein into the foamed mixture. Any suitable methods may be used to incorporate the starch and protein source, where used. For example, the starch and/or the protein source may be whisked in. In some examples, the hydrated foamed mixture is whisked via a stand mixer at high speed for one minute, and/or until soft peaks form, prior to incorporating the starch and/or the protein source. In some such examples, the starch and/or the protein source may be whisked into the foamed mixture at a slower mixing speed initially, and the mixing speed may gradually increase to incorporate the starch and/or the protein source. Any suitable starch and protein source (when included) may be used, including the examples described above. In some specific examples, a composition includes approximately 70 to 80 wt % foamed mixture, 3 to 5 wt % starch, and 2 to 4 wt % pea protein powder. In a more specific example, a composition includes 77.5 wt % foamed matrix, 3.7 wt % potato starch, and 3.7 wt % pea protein powder.

Method 200 also may include incorporating one or more flavorings into the foamed matrix, as indicated at 212. Any suitable flavoring or combination of flavorings may be used, including one or more dry flavoring, oil flavoring, oleoresin, juice concentrate, vegetable puree, and/or flavoring compound. When included, any suitable method may be used to incorporate the flavoring (e.g. whisking and/or blending). For example, such flavorings may be incorporated into the foamed mixture in a same mixing process as the starch and/or the protein source, after incorporating the starch and/or the protein source, after incorporating a fat source (214), or at any other suitable time. In one example, a composition includes less than 1 wt % flavoring. In another example, a composition includes 1 to 2 wt % flavoring. In yet another example, a composition includes 6 to 8 wt % flavoring.

Continuing with FIG. 2, method 200 may include incorporating a fat source into the foamed mixture, at 214. Any suitable method may be used to incorporate any suitable fat source. In some examples, incorporating the fat source comprises blending olive oil into the foamed mixture. In other examples, the fat source may comprise one or more of olive oil, coconut oil, a nut-derived oil, a legume-derived oil, shortening, and butter. As described above, the inclusion of a fat source may alter the taste, texture, and nutrition of the food product. It will be understood that any suitable quantity of the fat source be used. In one example, incorporating the fat source comprises incorporating a quantity of the fat source that is 7.5-30 wt % of the food product composition.

At 216, method 200 may include adding the foamed mixture into molds. Any suitable quantity of the foamed mixture may be added to each mold, in any suitable manner. In one specific example, method 200 comprises adding 1 gram of the foamed mixture into each mold. Molds may comprise any suitable configuration. In some examples, each mold may comprise one or more of a symmetrical shape (e.g. a circular shape), and a ridged surface. Asymmetrical shapes also may be used. As a more specific example, a mold may be configured to impart a scoop shape or a cavity within an interior structure of the food product. In other examples, the foamed mixture may be added in free-form shapes to a silicone baking sheet, instead of using a mold.

At 218, method 200 includes dehydrating the foamed mixture. Any suitable dehydration technique may be used, such as a thermal drying or baking process. For example, dehydrating the foamed mixture may comprise baking at a temperature between 120° F.-170° F. for a time duration of 3 to 9 hours. In one specific example, dehydrating the foamed mixture comprises baking the foamed mixture for 6 to 8 hours at an oven temperature of 145° F. Heat-set gelation of the water-soluble fiber-based material may occur during dehydration, for example due to unfolding, expansion, and subsequent rearranging of starch and protein.

As indicated at 220, method 200 may include a further baking process after dehydrating. In some examples, the further baking process comprises baking at a higher temperature than the temperature for dehydrating the foamed mixture. The further baking process also may comprise baking for a shorter time duration than the time duration for dehydrating the foamed mixture. Further, in some examples in which the food product is baked in molds, a further baking process may comprise removing the food product from the molds and arranging the food product on a baking sheet prior to performing the further baking process without the molds. In one specific example, method 200 includes baking the dehydrated foamed mixture for one minute at a temperature of 400° F. In any example, the further baking process after dehydrating may vary the texture, taste, and structure of the food product.

The food product is cooled after baking, and a fat coating may be applied to the cooled food product. An example fat coating process may involve passing the food product through a waterfall of a liquid-phase fat source, which may be performed on a conveyer belt system. A batch coating process also may be used. In an example batch coating process, a plurality of the food products may be dipped in a container of a liquid-phase fat source and placed on a grated surface such that excess fat coating may drip off each food product. Any suitable fat source may be used. In some examples, the fat source may comprise a fat source that is solid or semi-solid at room temperature, such as coconut oil, palm oil, and/or palm kernel oil, which may be heated to liquid-phase for the waterfall or batch coating process and "harden" on the food product at room temperature. Further, the fat coating may include additional ingredients to increase temperature stability of the fat coating (e.g. such that the fat coating does not completely melt upon body contact during handling/grasping). In any instance, a fat coating may provide additional nutritional benefit, and also may provide structural support.

As described above, the example method may provide a pre-portioned and ready to eat snack, which may help to reduce preparation time prior to consumption. FIG. 3 depicts nutritional information for an example food product. In this example, the food product composition includes approximately 14.9 wt % olive oil as a fat source, approximately 3.7 wt % potato starch as a starch, approximately 3.7 wt % pea protein powder as a protein additive, and the serving size is 19 1-gram crisps. In this example and in other examples, the food product may be combined with purees and/or dips to enhance nutritional value, taste, and texture of the food product. In some examples, the food product may comprise a puree within an interior of the food product. In other examples, the food product may be served alongside a puree (e.g. a dip). Further, when used as a crouton-like topping for a soup, the food product may retain structure and crunchy texture, even after floating on top of the soup for some time.

The food product disclosed herein has been defined within the IDDSI framework as a transitional food (2013). Testing was performed by two speech-language pathologists (SLP) and three SLP students at The University of Oregon (Eugene, OR). Results show that the food product disclosed herein is a transitional food that, in the presence of 1 cc of water for one minute, will disintegrate with thumb blanching pressure with the fork pressure test. Additionally, the food product dissolved to a level 4 consistency (puree). Physical properties of the food product were tested in vitro using the Instron Universal Testing System, Model 5943 (available from Instron Corp. of Norwood, MA). The minimum mechanical force required to fracture the food product was measured for a dry state and a wet state of the food product. As recommended in the IDDSI guidelines to test transitional foods, the food product was kept in room temperature water for 1 minute to obtain the wet state. The average load to fracture of the dry crisp was 2.03 N (±0.5), whereas the average load to fracture for the wet crisp was 0.20N (±0.15). This minimum pressure to breakdown the crisp is below the average bite force of 60-80N of a denture wearer and may not challenge the average tongue pressure in dysphagia in a dry or wet condition.

Another example provides a food product comprising a foamed aquafaba-based substrate network, a strengthening component configured to provide mechanical strength to the foamed aquafaba-based substrate network, a polysaccharide-based viscosity-increasing component, and a starch. In such an example, the food product may additionally or alternatively comprise one or more of an animal-derived protein source, a plant-derived protein source, a vegetable-derived fat source, an animal-derived fat source, an oil-based flavoring, and a dry flavoring. In such an example, the polysaccharide-based viscosity-increasing component may additionally or alternatively comprise one or more of xanthan gum, guar gum, locust bean gum, gum karaya, gum tragacanth, and/or gum Arabic. In such an example, the strengthening component may additionally or alternatively comprise a cellulosic gum. In such an example, the food product may additionally or alternatively comprise one or more of a puree within an interior of the food product and/or a fat coating on an exterior of the food product.

Another example provides a food product comprising a foamed matrix reinforced by a water-soluble fiber-based material, the water-soluble fiber-based material being configured to dissolve the food product to a puree thick consistency in the human mouth, a viscosity-increasing and foam-stabilizing component, a water-binding starch, a fat source, and a protein source. In such an example, the foamed matrix may additionally or alternatively comprise one or more of an aquafaba-based matrix and an egg white-based matrix. In such an example, the fat source may additionally or alternatively comprise one or more of coconut oil, olive oil, butter, shortening, a legume-derived oil, and a nut-derived oil. In such an example, the water-soluble fiber-based material may additionally or alternatively comprise a hydrocolloid material. In such an example, the water-binding starch may additionally or alternatively comprise one or more of potato starch, rice starch, tapioca, corn starch, and wheat starch. In such an example, the protein source may additionally or alternatively comprise one or more of a whey protein and a pea protein. In such an example, the food product may additionally or alternatively comprise one or more of an oil-based flavoring, a dry flavoring, a flavoring compound, a vegetable puree, a juice concentrate, and/or an oleoresin. In such an example, the food product may additionally or alternatively comprise one or more of a puree within an interior of the food product and/or a fat coating on an exterior of the food product.

Another example provides a method of manufacturing a food product, the method comprising incorporating air into an aqueous mixture comprising a matrix-forming component, a matrix-reinforcing component, and a viscosity-increasing component, after forming a foamed mixture, incorporating a starch into the foamed mixture, incorporating a protein source into the foamed mixture, incorporating a flavoring into the foamed mixture, the flavoring comprising one or more of an oil-based flavoring, a dry flavoring, a flavoring compound, a vegetable puree, a juice concentrate, and/or an oleoresin, and then dehydrating the foamed mixture. In such an example, the method may additionally or alternatively comprise, after incorporating the flavoring into the foamed mixture, incorporating a fat source into the foamed mixture, the fat source comprising one or more of an olive oil, a coconut oil, a nut-derived oil, a legume-derived oil, a shortening, and a butter. In such an example, the method may additionally or alternatively comprise one or more of baking the foamed mixture for a shorter time duration than the dehydrating and baking the foamed mixture at a higher temperature than the dehydrating. In such an example, dehydrating the foam may additionally or alternatively comprise dehydrating at a temperature between 120° F.-170° F. for a time duration of 3-9 hours. In such an example, the method may additionally or alternatively comprise hydrating the foamed mixture for 4-6 hours at a temperature between 35-40° F. prior to incorporating the starch. In such an example, incorporating the air into the aqueous mixture may additionally or alternatively comprise whisking the aqueous mixture for less than two minutes. In such an example, the method may additionally or alternatively comprise, prior to dehydrating the foamed mixture, one of adding the foamed mixture to molds and adding the foamed mixture in free-form shapes to a baking sheet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A crisp food product, comprising:
   a foamed matrix comprising dehydrated aquafaba including a protein and a starch, and one or more of xanthan gum, guar gum, locust bean gum, gum karaya, gum tragacanth, or gum arabic as a viscosity-increasing and foam-stabilizing component;
   a water-soluble fiber as a matrix-reinforcing component, the water-soluble fiber comprising one or more of hydroxypropylmethylcellulose, carboxymethylcellulose, or methylcellulose, the water-soluble fiber being configured to dissolve the crisp food product to a puree thick consistency in a human mouth;
   a protein source comprising a different protein than the protein of the dehydrated aquafaba;
   an incorporated starch comprising a different starch than the starch of the dehydrated aquafaba; and
   a fat source in a range of 7.5% to 30% by weight of a mixture from which the crisp food product is formed, wherein
   the crisp food product is a transitional food within an International Dysphagia Diet Standardisation Initiative (IDDSI) framework such that a 1.5 cm×1.5 cm sample of the crisp food product in the presence of one cubic centimeter of water for one minute disintegrates when thumb-blanching pressure is applied with a fork, and dissolves to level 4 puree consistency under the IDDSI framework.

2. The crisp food product of claim 1, wherein the fat source comprises one or more of coconut oil, olive oil, butter, shortening, a legume-derived oil, and/or a nut-derived oil.

3. The crisp food product of claim 1, wherein the incorporated starch comprises potato starch.

4. The crisp food product of claim 1, further comprising one or more of an oil flavoring, a dry flavoring, a flavoring compound, a vegetable puree, a juice concentrate, and/or an oleoresin.

5. The crisp food product of claim 1, further comprising a fat coating on an exterior of the crisp food product.

6. The crisp food product of claim 5, wherein the fat coating comprises one or more of coconut oil, palm oil, or palm kernel oil.

7. The crisp food product of claim 1, wherein the incorporated starch is in a range of 3% to 5% by weight of the mixture from which the crisp food product is formed.

8. The crisp food product of claim 1, wherein the protein source is in a range of 2% to 4% by weight of the mixture from which the crisp food product is formed.

9. The crisp food product of claim 1, further comprising a puree within an interior of the crisp food product.

10. The crisp food product of claim 1, wherein the protein source comprises a pea protein.

11. The crisp food product of claim 10, wherein the pea protein is in a range of 2% to 4% by weight of a mixture from which the crisp food product is formed.

* * * * *